July 9, 1963
J. MAZZARINS
3,096,840
TRACTOR SUSPENSION PERMITTING PIVOTAL MOVEMENT OF TRACK FRAMES
Filed May 25, 1960
4 Sheets-Sheet 1
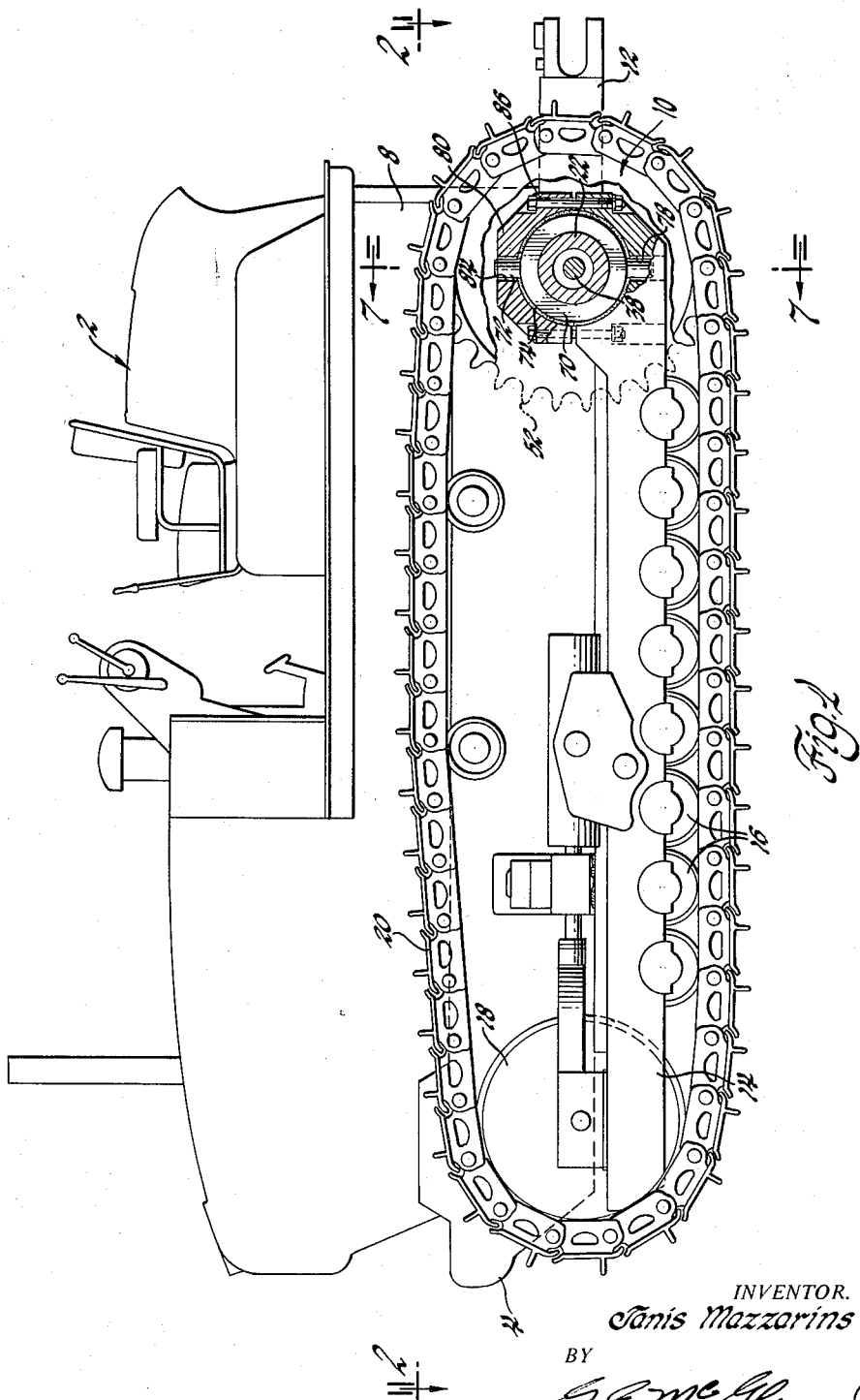
INVENTOR.
Janis Mazzarins
BY
ATTORNEY

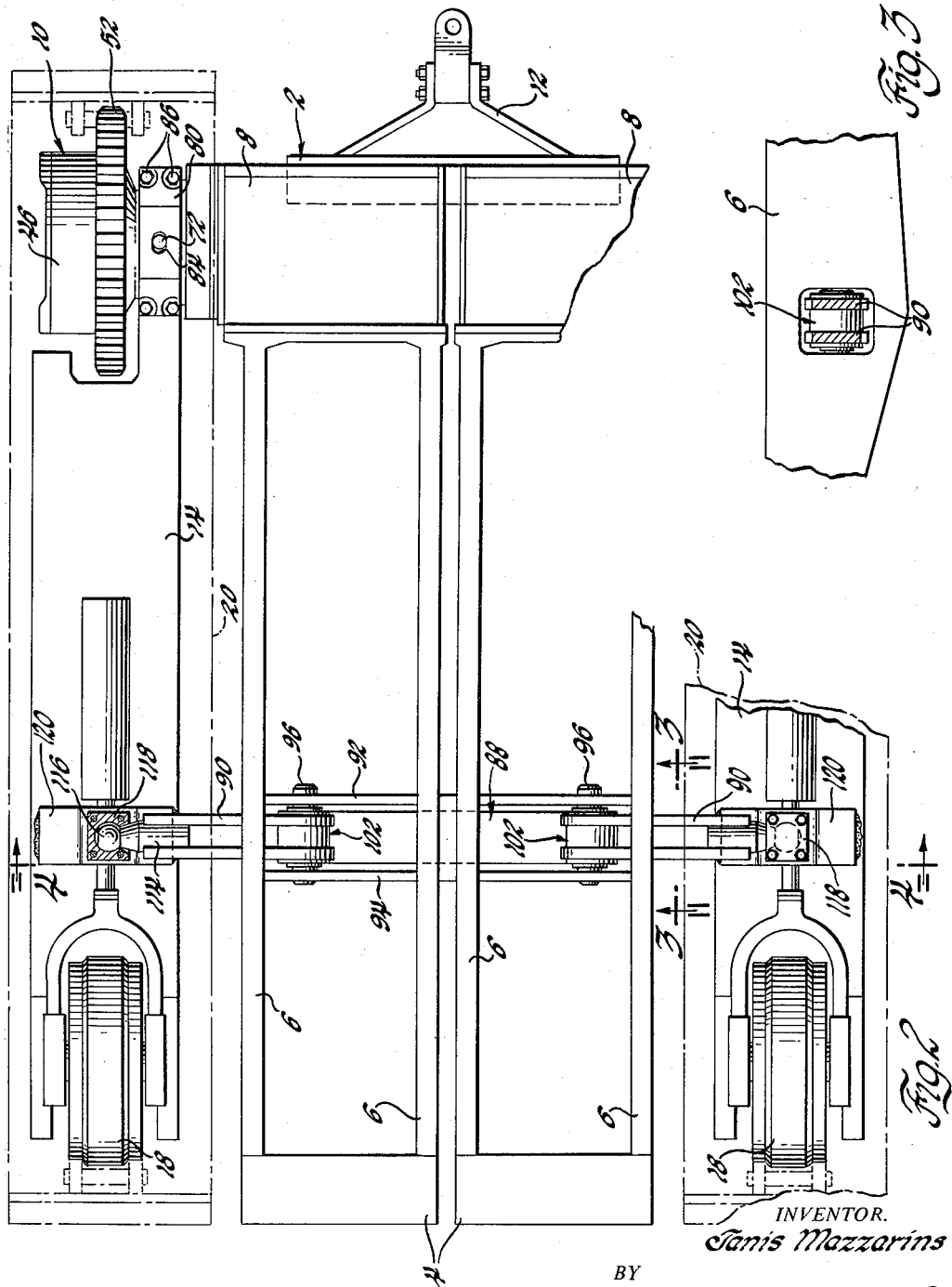

July 9, 1963

J. MAZZARINS 3,096,840

TRACTOR SUSPENSION PERMITTING PIVOTAL
MOVEMENT OF TRACK FRAMES

Filed May 25, 1960

INVENTOR.
Janis Mazzarins
BY
G.E. McGlynn Jr.
ATTORNEY

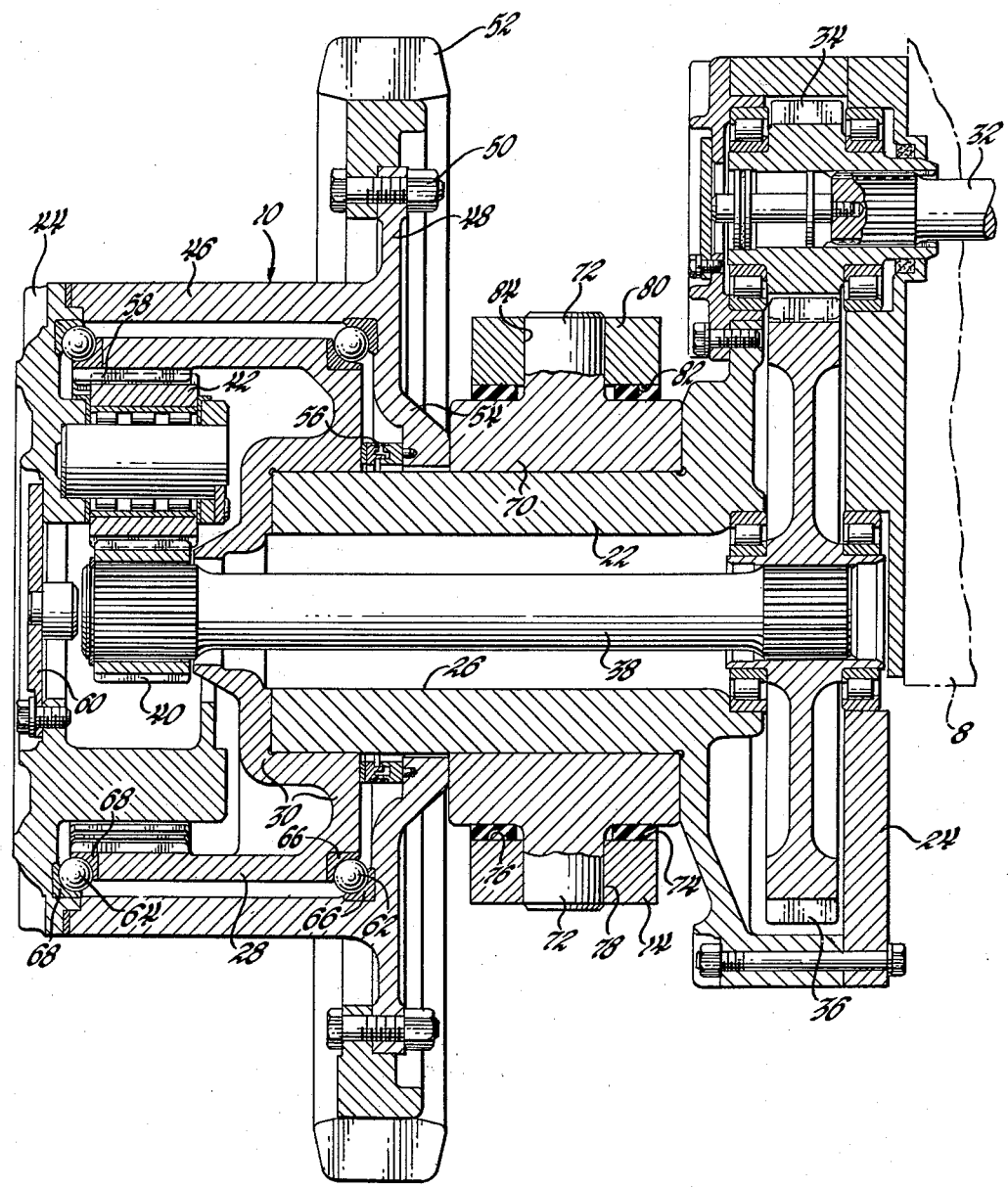

United States Patent Office 3,096,840
Patented July 9, 1963

3,096,840
TRACTOR SUSPENSION PERMITTING PIVOTAL MOVEMENT OF TRACK FRAMES
Janis Mazzarins, Northfield, Ohio, assignor to General Motors Corporation, Detroit, Mich., a corporation of Delaware
Filed May 25, 1960, Ser. No. 31,775
4 Claims. (Cl. 180—9.5)

This invention relates to tracked vehicles and, in particular, to an improved suspension structure for crawler tractors of the type illustrated generally in Unittd States Patent No. 2,786,724, entitled "Track Suspension," issued March 26, 1957, to Raymond Q. Armington et al.

Crawler tractors of the type herein contemplated, and with reference to the Armington patent aforementioned by way of example, typically include a main tractor frame or chassis, a suitable power plant and power transmission means mounted on the tractor frame and a sprocket wheel final drive assembly extending laterally outwardly from each side of the tractor frame or chassis at the rear of the latter. Laterally spaced and longitudinally extending track frames, one on each side of the main tractor chassis, are utilized to suspend the tractor frame or chassis, and each track frame includes longitudinally spaced track rollers and an idler wheel so related with respect to each of the aforementioned sprocket wheel assemblies so as to entrain a ground-engaging endless track for supporting and propelling the tractor.

Means are provided for connecting or suspending the main tractor chassis or frame on the respective track roller frames in such a manner as to permit the track frames to pivot relative to the tractor chassis and to each other as the vehicle negotiates irregular terrain. To this end, pivotal connections are made between each side of the tractor main frame and a rearward portion of each of the respective track roller frames as shown, again by way of example, in the aforementioned Armington et al. patent. It will be noted that such connections define a horizontal transverse axis of oscillatory movement of the track frames relative to the main tractor chassis which is just forward of and parallel to the axis of rotation of the sprocket wheel final drive assembly. Typically, a third point of connection is made between the tractor chassis and each of the track roller frames by means of a transversely extending rigid equalizer bar mechanism having its respective ends pivotally secured to a forward portion of the respective track frames while an intermediate portion thereof is pivotally connected to the tractor chassis. As a result of such a construction, the main tractor frame or chassis is suspended and supported on the track frames which are susceptible and capable of oscillatory or rising and falling movement about their rearward pivotal connections to the tractor chassis.

Such tractors and their suspensions are subjected to several types of loadings. In the first instance, the tractor suspension must bear the substantial static load of the main tractor chassis. Additionally, the suspension must withstand various dynamic and shock loadings occasioned by the generally rough work to which such a tractor is subjected and, particularly, by the operation of various implements with which the tractor may be equipped. For example, if such a tractor is equipped with a bulldozer blade adapted for pioneering work such as rooting trees or rough dozing work, it will be readily apparent that the forces imposed upon such a dozer blade will be transmitted from the main tractor chassis through the suspension. Furthermore, inasmuch as the track frames are pivotally connected at the rearward ends to the tractor chassis while the forward ends thereof are maintained in a laterally spaced relationship by the equalizer bar mechanism, it will be apparent that the rearward bearing or pivot elements must accommodate swinging movement of the track frames relative to each other and to the tractor chassis. Moreover, the equalizer bar connection causes swinging of the forward portion of each of the track frames in an arcuate path causing a toe-in action. Additionally, due to the fact that the track frames are pivoting about fixed connections to the tractor chassis, their respective points of connection to the ends of the equalizer bar move in arcs toward and away from the equalizer connection to the chassis as the track frames oscillate. Accordingly, the connection of the equalizer bar to the tractor chassis must further accommodate loads occasioned by the aforementioned relative movement of the ends of the equalizer bar relative to the connection thereof to the tractor chassis as the track frames rise and fall.

From the foregoing consideration of prior art suspension mechanisms as illustrated generally by the Armington et al. patent aforementioned, it may be seen that the respective connections of the main tractor chassis to the respective track roller frames must accommodate relative rising and falling movement of the track roller frames with respect to each other and the main tractor chassis. Inasmuch as the rise and fall of the track frames results in a toeing-in action of the forward portion of each of the frames due to the equalizer bar connection, it is also apparent that the rearward pivotal connections of each of the track roller frames to the tractor chassis must suitably provide for such toe-in action as well as accommodating any component of track frame motion in the vertical planes or while rising or falling. It will also be seen that such a tractor suspension is subjected to severe and varied types of loads and, accordingly, the equalizer bar connection and rearward connections of the track frames to the main tractor chassis must be capable of absorbing and cushioning these loads. It will be equally apparent that the prior art connections of a rearward portion of each track roller frame to the main tractor chassis, being as they are forward of the axis of the final drive or sprocket assembly, is in an inefficient position from a kinematic standpoint; that is, the rearward portions of the track roller frames to the rear of their pivot connections to the tractor chassis will oscillate relative to the fixed axis of the sprocket drive shafts. Moreover, this type of construction reduces the degree of oscillation capable of being achieved by each track frame.

It is, therefore, a principal object and feature of this invention to provide an improved suspension construction for suspending the main tractor chassis of a crawler tractor on its respective track roller frames, and which suspension is characterized by the use of resilient supports at each point of connection of the main tractor chassis to the respective track roller frames.

It is yet another object and feature of this invention to provide such a tractor suspension including the resilient or cushioning suspenion connections aforementioned which will effectively absorb the static and dynamic loads aforementioned including those occasioned by the relative oscillation of the track roller frames.

It is yet another object and feature of this invention to provide an improved suspension connection between the rearward end of each track roller frame and the sprocket final drive assembly whereby the suspension connection may not only be cushioned for the purposes aforementioned, but the track roller frames are capable of oscillation about the axis of the final drive assemblies which is most efficient from a kinematic standpoint and provides an increased range of oscillation of the track frames.

These and other objects, features and advantages of this invention will become more apparent hereinafter as the description of the invention proceeds, and in which reference is made to the following drawings in which:

FIGURE 1 is a side elevation of a crawler tractor equipped with the present invention;

FIGURE 2 is a fragmentary view taken on line 2—2 of FIGURE 1;

FIGURE 3 is a view taken on line 3—3 of FIGURE 2;

FIGURE 7 is an enlarged view taken on line 7—7 of FIGURE 1.

Figure 4:
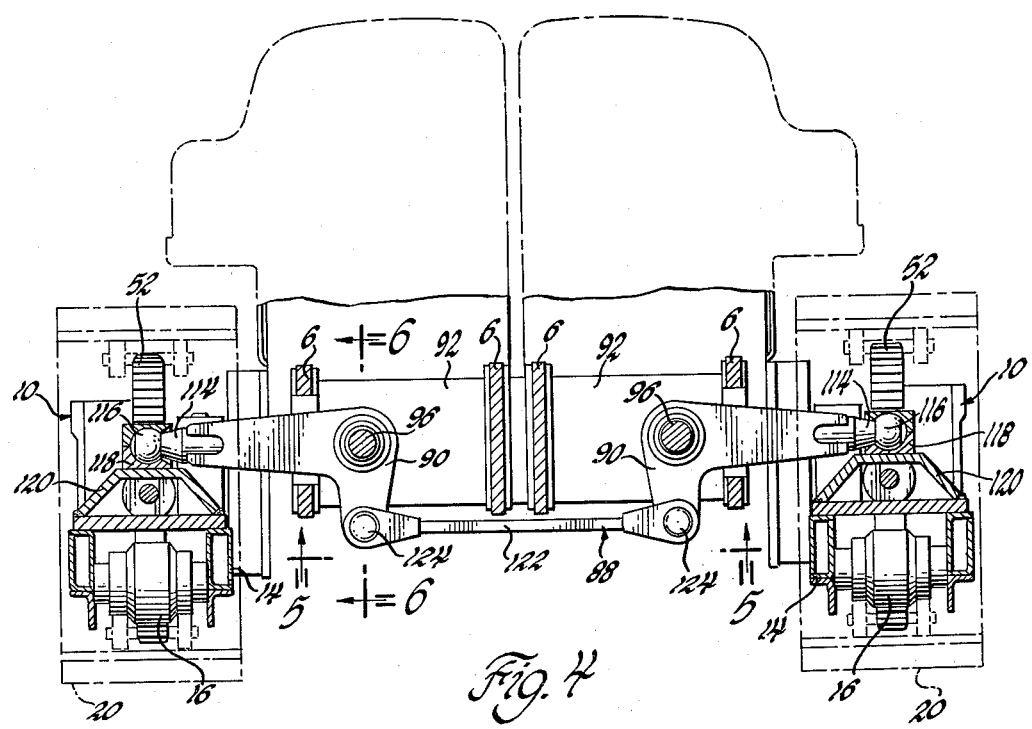
FIGURE 4 is a view taken on line 4—4 of FIGURE 2.
Figure 5:
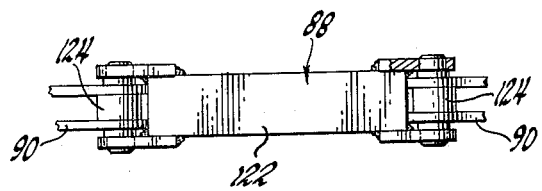
FIGURE 5 is a view taken on line 5—5 of FIGURE 4.

Referring now to the drawings, and particularly FIGURES 1, 2 and 4 thereof, the crawler tractor indicated generally at 2 may be seen to comprise two frame sections 4, each of which includes the laterally spaced, longitudinally extending and rigidly interconnected main frame members 6. The final drive transmission housings 8 are rigidly secured to the rear of each frame section 4 in side-by-side relation, and each housing contains a suitable and conventional final drive transmission adapted to drive a sprocket wheel final drive assembly 10 mounted on and projecting laterally from the outer end walls of each housing 8. The dual frame sections 4 are rigidly interconnected by suitable means including drawbar 12 to form a main tractor frame and chassis on which there may be mounted a single suitable power plant and power transmission means, both being conventional and not shown, for conducting drive to and through the transmissions in housings 8 to the final drive assemblies 10. On the other hand, it should be noted that the dual frame structure aforedescribed is particularly adapted and intended to receive two completely independent power trains for driving the final drive assemblies as disclosed in the copending United States application Serial No. 455,903 entitled "Twin Engine Crawler Tractor," filed September 14, 1954, now Patent No. 2,955,845, in the names of Russell C. Williams et al. Thus, each frame structure 4 may mount a suitable power plant and power transmission for conducting drive to and through the final drive transmission in each housing 8 to the respective sprocket assemblies 10.

Irrespective of whether only one power plant and transmission is mounted on the main tractor chassis and drivingly connected to the transmissions within the housings 8, or two complete and independent power plants and transmission assemblies are mounted side by side on the dual frame sections 4 illustrated particularly in FIGURE 2, it will be appreciated that drive is conducted through the transmissions located within the respective housings 8 to the sprocket final drive assemblies 10 projecting laterally from the outer side faces of each of the housings 8. Each of the track roller frames 14, located one on each side of the main tractor chassis, has a rearward portion adapted to be mounted about each of the final drive assemblies 10 in a manner to be described. A plurality of spaced track rollers 16 are rotatably journalled upon each track roller frame 14 and a suitable idler wheel 18 is rotatably supported at the forward end of each track roller frame. The endless crawler track linkage 20, comprising a plurality of articulately interconnected track shoes in the usual manner, is entrained about each final drive sprocket assembly 10 and extends therefrom over the idler wheel 18 and rollers 16 to support the tractor in propelling relationship to the ground.

Reference will now be made particularly to FIGURE 7 and a description of each of the final drive assemblies 10. Each such assembly includes a final drive housing comprising a hollow generally cylindrical neck portion 22 adapted to have its inner end removably secured to the face of a conventional drop case 24 rigidly secured to the outer side face of each of the transmission housings 8. The housing neck portion 22 extends laterally from the drop case and has an axial bore 26 extending therethrough. A hollow cylindrical drum or hub 28 is located at the outer end of each of the housing neck portions 22, and includes a radial flange structure 30 suitably rigidly secured to the outer end of the housing neck portion 22.

Driving power from each of the final drive transmissions located within the respective transmission housings 8 is conducted through the conventional drive shaft 32 to a pinion 34 secured thereto and rotatably mounted within the drop case 24 for driving connection with a larger gear 36 likewise suitably rotatably journalled within the drop case and non-rotatably secured to the rotatable final drive shaft 38 of the sprocket wheel assembly. Shaft 38 extends through the housing bore 26 and terminates in a sun pinion 40 located within the hollow cylindrical drum or hub 28. The final drive sun pinion 40 meshingly engages a plurality of spaced planet pinions 42 rotatably journalled in the usual manner on an annular planet carrier plate 44 having its peripheral edges suitably rigidly secured to the outer end of the hollow cylindrical sprocket wheel hub or drum 46 which surrounds drum or hub 28 and has at its axially inner end an annular radially outwardly projecting attaching flange 48 for receiving suitable fasteners 50 to rigidly secure the annular sprocket wheel 52 thereon. Additionally, the inner end of the sprocket wheel hub 46 includes a radially inwardly directed flange 54 closely embracing the exterior of the housing neck portion 22 laterally outboard from the drop case 24. Sealing means 56 is interposed between the hub or drum flanges 30 and 54. Each of the planet pinions 42 also meshes with an annular internal reaction gear 58 formed on the axial outer extremity of the fixed housing hub 28, while a plate 60 is removably secured over an aperture formed centrally of the carrier plate 44 for inspecting and servicing the final drive gearing.

The sprocket wheel hub 46 is rotatably supported about the housing drum 28 by first and second axially spaced annular groupings of anti-friction bearing elements such as the ball bearings 62 and 64 interposed between cooperating opposed bearing races 66 and 68 at the axially inner and outer ends of drums 28 and 46. It should be noted that the structure and relationship of the bearing structure aforementioned will prevent substantial axial creeping movement of the sprocket hub 46 relative to the housing hub 28, thereby insuring that the planetary gearing comprising the sun gear 40, planet pinions 42 and ring gear 58 remains in proper engagement. Additionally, this bearing structure is located outboard of sprocket 52 on that portion of drum 46 which receives torque forces during operation, thereby effectively transmitting such forces directly to the final drive housing through the housing hub or drum 28.

Reference will now be made to FIGURES 1, 2 and 7 in particular with respect to a description of the suspension connection between the rearward portions of each of the track roller frames 14 and the final drive assemblies 10 whereby each of the track frames may oscillate about the axis of the final drive assembly or, more accurately, the final drive shaft 38 while being capable of toe-in action under the influence of the equalizer bar construction to be described. To this end, an annular adapter bushing 70 is suitably rigidly mounted around each housing neck portion 22 between the drop case 24 and sprocket drum flange 54, and includes oppositely projecting vertically aligned pivot axles or pins 72. The axis of axles 72 intersects the axis of sun shaft 38. An annular mass of suitable resilient cushioning material 74 surrounds the exterior surface of adapter 70. The rearward end of each roller frame is formed with an arcuate bearing seat 76 and an elongate slot 78 for embracing the lower portion of the adapter 70 and receiving the lower pivot axle 72. In similar fashion, a cap member 80 includes an arcuate bearing seat 82 and an elongate slot 84 for embracing the upper portion of adapter 70 and receiving the upper pivot axle 72. It will be understood that the cap member 80 and the rearward portion of the track roller frame 14 form a yoke in which the parts may be drawn together to firmly embrace cushioning material 74 by means of the tie bolts 86.

It will be noted that each of the identical apertures 78 and 84 is elongate, and the side edges thereof closely embrace the associated axle 72 laterally. The purpose of this construction is to prevent lateral movement of the rear ends of the track roller frames relative to each other or the final drive housing 22, while permitting a forward portion of the track roller frames to oscillate vertically about the axis of sun shaft 33 and to toe-in about the axis of the axle shafts 72 as the track frames rise and fall.

The forward suspension for the main tractor chassis on the track roller frames 14 is shown particularly in FIGURES 2 through 6, and includes an equalizer bar assembly indicated generally at 88 in FIGURE 4. The equalizer assembly includes a pair of identical but oppositely mounted bell crank levers 90, each of which is adapted to have an intermediate portion thereof connected between longitudinally spaced plates 92 and 94 depending from the main frames 4 and through which there extends the longitudinal pins or shafts 96. Each of the pins or shafts 96 are fixed against rotation and secured to the plates 92 and 94 by a locking plate or key 98 secured to the plate 92 and cooperating with keyways 100 on the periphery of the shaft or pin (see FIGURE 6). Naturally, the other end of each of the shafts or pins 96 may be similarly connected non-rotatably to plate 94. A resilient bushing assembly indicated generally at 102, and shown particularly in FIGURE 6, forms an operative pivot connection between each of the fixed shafts or pins 96 and the intermediate portion of each of the bell crank levers 90.

Figure 6:
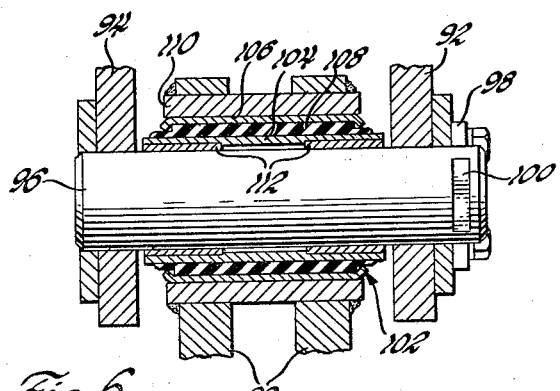
FIGURE 6 is an enlarged view taken on line 6—6 of FIGURE 4.

Each of the resilient bushing assemblies 102, as shown particularly in FIGURE 6, includes radially spaced inner and outer coaxial sleeves 104 and 106, respectively, between which there is secured as by bonding a suitable resilient material such as a mass of rubber 108. The outer sleeve 106 is rigidly secured to the inner surface of a longitudinally extending cylindrical bushing 110 firmly secured to each bell crank 90 substantially at the midpoint of the latter. Sleeve-like bearings 112 are press-fitted or otherwise secured within the inner sleeve 104 and may frictionally but loosely engage the shaft 96 for rotational and axial movement relative thereto. It will be noted from a consideration of FIGURE 6 that the extreme axial ends of the bushing assembly 102 are slightly spaced from adjacent walls of the depending plates 92 and 94 secured to the tractor chassis to accommodate the aforementioned relative axial movement. If desired, the inner sleeve 104 may be fixedly secured to the shaft or pin 96 to resist rotational and axial movement relative to the shaft 96.

The laterally outwardly projecting portions of each of the levers 90 project through apertures in the outside main frame members 6 as indicated in FIGURE 3 and rigidly mount laterally projecting shafts 114 terminating in spherical ball members 116 seated within a similarly shaped socket 118 secured to an upstanding bracket 120 carried by the upper walls of the respective track frame assemblies 14. The depending legs of each of the bell crank levers 90 are interconnected by means of a rigid link 122 having its opposite ends pivotally connected at 124 to the respective bell crank levers.

In operation, drive is conducted from the transmissions located within the housings 8 to the respective sprocket wheels 52 by means of the power train extending from the transmission output shaft 32 through the final drive shaft 38 to the planetary gearing connected thereto and, particularly, the planet pinions 42 reacting against fixed reaction gear 58 to rotate the sprocket wheel on the bearings 62 and 64. Rotation of the sprocket wheels, of course, drives the endless tracks 20 so as to propel the tractor across the ground. As aforementioned, due to the particular location of the bearing elements 62 and 64 with respect to or outboard of the sprocket wheel 52, the principal forces and particularly torque loads imposed on such a final drive structure are transmitted directly from the hub 46 to the housing hub 28. Additionally, the bearings are so located with respect to each other as to resist axial movement or creeping action of the planetary gearing so as to maintain the planetary gearing in proper meshing relationship.

As the tractor traverses irregular terrain, each of the track frames 14 is capable of rising and falling action about the axis of a final drive shaft 38, which action is accommodated due to the elongate nature of the slots 78 and 84 confining the axle pins or shafts 72. At the same time, toe-in action of a forward portion of each of the track frames interconnected by the equalizer bar mechanism 88 is additionally accommodated by reason of the rearward track frame portions being capable of pivotal movement about the vertical axis of the oppositely projecting pins or axle shafts 72. On the other hand, inasmuch as the elongate slots 78 and 84 laterally embrace the axles or pins 72, the track frames cannot move laterally on the final drive assemblies. Moreover, the resilient mass 74 provides a cushioned support or interconnection between the main tractor chassis and the respective track roller frames.

The equalizer bar assembly 88 serves to support the forward end of the main tractor chassis on the track roller frames, and to prevent uncontrolled spreading or converging action of the forwardly extending track frame assemblies. Additionally, the bushing assemblies 102 provide a yieldable means for cushioning the various loads imposed upon the vehicle, and for preventing over-stressing the equalizer bar structure as the track frames rise and fall. Thus, as the track frames rise and fall, the sockets 118 thereon swing in arcuate paths resulting in rotation of the bushing assemblies about the axes of pins 96 and axial sliding movement therebetween. If, as previously suggested, the inner bushing sleeve 104 is fixed with respect to the shaft 96, the equalizer levers 90 may rotate substantially about the axes of the shafts 96 and a stress will be imposed upon the rubber mass 108 while permitting equalizer lever movement without overstressing the latter. Similarly, to accommodate the toe-in action of the track assemblies, the axis of the outer sleeve 106 will become canted with respect to the axis of the inner sleeve 104 and shaft 96 thereby stressing the rubber mass 108 which will absorb this movement without overstressing the equalizer bell cranks.

From the foregoing description, it may be seen that the present invention provides an entirely cushioned suspension for a crawler tractor of the type comprising a main frame suspended upon longitudinally extending track frames. Moreover, the improved suspension is characterized by a novel final drive assembly which permits connection of the track roller frames to the final drive for oscillation about the axis of final drive shaft. Finally, the final drive assembly includes a novel construction for permitting the aforementioned connection of the track roller frames thereto, while additionally providing better transmission of loads imposed on the sprocket wheel to the sprocket housing and prevention of axial creep in the final drive planetary gearing thereby insuring proper enmeshment of the latter throughout the life of the apparatus.

While but one form of the invention has been selected for an illustration thereof, other forms will be apparent to those skilled in the art. Therefore, the embodiment shown in the drawing is merely for illustrative purposes, and is not intended to limit the scope of the invention which is defined by the claims which follow.

I claim:

1. A suspension for a crawler tractor comprising a main frame, a drive sprocket assembly at each side of said main frame at the rear thereof, each sprocket assembly comprising a housing operatively rigidly secured to one side of said main frame and projecting laterally outwardly therefrom, a sprocket wheel mounted on the outer end of said housing and spaced from said main frame, means for rotatably driving said sprocket wheel, an adapter surrounding and substantially rigidly secured to each of said housings between said main frame and said sprocket wheel, each of said adapters comprising an annular external bearing surface substantially coaxial with the axis of rotation of said sprocket wheel and a pair of oppositely projecting substantially vertically aligned axles, a track roller frame at each side of said main frame, each of said roller frames comprising a yoke including an annular internal bearing surface at the rear end thereof surrounding said adapter bearing surface, a pair of oppositely disposed elongate slots in each of said yokes receiving and laterally confining said axles, said slots permitting oscillation of said track roller frames about the axis of rotation of said sprocket wheels and toe-in of said track roller frames about the axis of said axles while preventing lateral shifting movement of said track roller frames on said adapters, and an equalizer bar mechanism pivotally connecting a forward portion of said main frame to a forward portion of each of said track roller frames to maintain the latter in a predetermined spaced relationship.

2. A suspension for a crawler tractor comprising a main frame, a drive sprocket assembly at each side of said main frame at the rear thereof, each sprocket assembly comprising a housing operatively rigidly secured to one side of said main frame and projecting laterally outwardly therefrom, a sprocket wheel mounted on the outer end of said housing and spaced from said main frame, means for rotatably driving said sprocket wheel, an adapter surrounding and substantially rigidly secured to each of said housings between said main frame and said sprocket wheel, each of said adapters comprising an annular external bearing surface substantially coaxial with the axis of rotation of said sprocket wheel and a pair of oppositely projecting substantially vertically aligned axles, a track roller frame at each side of said main frame, each of said roller frames comprising a yoke including an annular internal bearing surface at the rear end thereof surrounding said adapter bearing surface, resilient means confined between the respective bearing surfaces of said adapter and yoke, a pair of oppositely disposed elongate slots in each of said yokes receiving and laterally confining said axles, said slots permitting oscillation of said track roller frames about the axis of rotation of said sprocket wheels and toe-in of said track roller frames about the axis of said axles while preventing lateral shifting movement of said track roller frames on said adapters, and an equalizer bar mechanism pivotally connecting a forward portion of said main frame to a forward portion of each of said track roller frames to maintain the latter in a predetermined spaced relationship.

3. A suspension for a crawler tractor comprising a main frame, a drive sprocket assembly at each side of said main frame at the rear thereof; each sprocket assembly comprising a housing operatively rigidly secured to one side of said main frame and projecting laterally outwardly therefrom, a sprocket wheel, means rotatably supporting said sprocket wheel about the outer end of said housing and spaced from said main frame, a drive shaft rotatably supported within said housing, means for conducting drive from said shaft to said sprocket wheel; an adapter surrounding and substantially rigidly secured to each of said housings between said main frame and said sprocket wheel, each of said adapters comprising an annular external bearing surface substantially coaxial with said drive shaft and a pair of oppositely projecting axles substantially aligned on a vertical axis intercepting at a right angle the axis of rotation of said drive shaft, a track roller frame at each side of said main frame, each of said roller frames comprising a yoke including an annular internal bearing surface at the rear end thereof surrounding said adapter bearing surface, resilient means confined between the respective bearing surfaces of said adapter and yoke, a pair of oppositely disposed elongate slots in each of said yokes receiving and laterally confining said axles, said slots permitting oscillation of said roller frames about the axis of rotation of said drive shaft and toe-in of said roller frames about the axis of said axles while preventing lateral shifting movement of said roller frames on said adapters; an equalizer mechanism comprising a pair of bell cranks respectively pivotally connected intermediate their ends to a forward portion of said main frame on parallel longitudinally extending axes, means pivotally connecting one end of each of said bell cranks to a forward portion of each of said roller frames, and link means pivotally interconnecting the other ends of said bell cranks.

4. A suspension for a crawler tractor comprising a main frame, a drive sprocket assembly at each side of said main frame at the rear thereof, each sprocket assembly comprising a housing operative rigidly secured to one side of said main frame and projecting laterally outwardly therefrom, a sprocket wheel mounted on the outer end of said housing and spaced from said main frame, means for rotatably driving said sprocket wheel, an adapter member surrounding and substantially rigidly secured to each of said housings, a track roller frame at each side of said main frame, each of said roller frames comprising a yoke member at the rear end thereof surrounding said adapter member, at least one vertically projecting axle connected to one of said members, a slot formed in the other of said members for receiving and laterally confining each such axle, said slot permitting oscillation of said track roller frame about the axis of rotation of said sprocket wheels and toe-in of said track roller frames about the axis of said axle while preventing lateral shifting movement of said track roller frames on said adapters, and an equalizer bar mechanism pivotally connecting a forward portion of said main frame to a forward portion of each of said track roller frames to maintain the latter in a predetermined spaced relationship.

References Cited in the file of this patent

UNITED STATES PATENTS

| Re. 11,760 | Riker _____ July 18, 1899 |
| 1,413,148 | Wickersham _____ Apr. 18, 1922 |
| 1,417,795 | Cook et al. _____ May 30, 1922 |
| 1,479,348 | Wickersham _____ Jan. 1, 1924 |
| 1,618,203 | Jett _____ Feb. 22, 1927 |
| 2,074,319 | Baker et al. _____ Mar. 23, 1937 |
| 2,518,481 | Maguire _____ Aug. 15, 1950 |
| 2,702,603 | Risk et al. _____ Feb. 22, 1955 |
| 2,833,361 | Schwarts _____ May 6, 1958 |
| 2,940,532 | Lear et al. _____ June 14, 1960 |
| 2,948,347 | Risk et al. _____ Aug. 9, 1960 |

FOREIGN PATENTS

| 141,963 | Great Britain _____ Apr. 29, 1920 |